United States Patent
Rathke et al.

(10) Patent No.: US 11,840,209 B2
(45) Date of Patent: Dec. 12, 2023

(54) VEHICLE CRANE HAVING HYDROPNEUMATIC SUSPENSION AND A BRAKING SYSTEM COMPRISING AT LEAST TWO BRAKING CIRCUITS

(71) Applicant: Tadano Demag GmbH, Zweibrücken (DE)

(72) Inventors: Hans-Joachim Rathke, Zweibrücken (DE); Jörg Sassenberger, St. Ingbert (DE)

(73) Assignee: Tadano Demag GmbH, Zweibrücken (DE)

( * ) Notice: Subject to any disclaimer, the term of this patent is extended or adjusted under 35 U.S.C. 154(b) by 410 days.

(21) Appl. No.: 17/262,304

(22) PCT Filed: Jul. 24, 2019

(86) PCT No.: PCT/EP2019/069978
§ 371 (c)(1),
(2) Date: Jan. 22, 2021

(87) PCT Pub. No.: WO2020/020977
PCT Pub. Date: Jan. 30, 2020

(65) Prior Publication Data
US 2021/0309193 A1    Oct. 7, 2021

(30) Foreign Application Priority Data

Jul. 25, 2018  (DE) .......................... 102018117999.5
Aug. 16, 2018  (DE) .......................... 102018119975.9

(51) Int. Cl.
*B60T 8/18* (2006.01)
*B60G 17/015* (2006.01)
*B60T 13/58* (2006.01)

(52) U.S. Cl.
CPC .......... *B60T 8/1837* (2013.01); *B60G 17/015* (2013.01); *B60T 13/581* (2013.01);
(Continued)

(58) Field of Classification Search
CPC ........ B60T 8/1834; B60T 8/30; B60T 8/1766; B60T 13/581; B60T 8/1837; B60G 17/015
See application file for complete search history.

(56) References Cited

U.S. PATENT DOCUMENTS 4,119,353 A  * 10/1978  Bihlmaier ............. B60T 8/1862
                                                           303/22.5
4,986,609 A    1/1991  Cole et al.

FOREIGN PATENT DOCUMENTS

CN  105691141 A  *  6/2016  ......... B60G 17/0525
DE  2622534 A1    12/1977
(Continued)

OTHER PUBLICATIONS

International Search Report of the International Searching Authority from corresponding Patent Cooperation Treaty (PCT) Application No. PCT/EP2019/069978, indicated completed on Oct. 16, 2019.
(Continued)

*Primary Examiner* — Melanie Torres Williams
(74) *Attorney, Agent, or Firm* — Gardner, Linn, Burkhart & Ondersma, LLP

(57) ABSTRACT

A vehicle crane having a hydropneumatic suspension and a braking system including wheel brakes and a first braking circuit assigned to the wheel brakes of at least one vehicle axle and a second braking circuit assigned to the wheel brakes of at least one other vehicle axle. In order to adapt the actuation of the braking system to the weight state, the hydropneumatic suspension is coupled to an automatically load-dependent braking force regulator that is operatively
(Continued)

connected to one of the braking circuits or to one of their braking circuit sections such that, on the basis of a weight state signal of the vehicle crane generated from the hydropneumatic suspension, a braking pressure generated inside the braking circuit or braking circuit section coupled to the automatically load-dependent braking force regulator, can be varied with respect to a braking pressure generated simultaneously inside the other braking circuit or braking circuit section.

20 Claims, 3 Drawing Sheets

(52) U.S. Cl.
CPC ...... *B60G 2400/60* (2013.01); *B60G 2500/30* (2013.01); *B60G 2800/01* (2013.01); *B60G 2800/22* (2013.01); *B60G 2800/912* (2013.01); *B60T 2250/02* (2013.01); *B60T 2260/06* (2013.01)

(56) References Cited

FOREIGN PATENT DOCUMENTS

| | | | |
|---|---|---|---|
| DE | 202007004091 U1 | 7/2008 | |
| DE | 102009046684 A1 * | 5/2011 | ............ B60G 17/04 |
| JP | S6025810 A | 2/1985 | |

OTHER PUBLICATIONS

International Written Opinion of the International Searching Authority from corresponding Patent Cooperation Treaty (PCT) Application No. PCT/EP2019/069978, indicated completed on Oct. 16, 2019.

* cited by examiner

VEHICLE CRANE HAVING HYDROPNEUMATIC SUSPENSION AND A BRAKING SYSTEM COMPRISING AT LEAST TWO BRAKING CIRCUITS

CROSS REFERENCE TO RELATED APPLICATION

The present application claims the priority benefits of International Patent Application No. PCT/EP2019/069978, filed Jul. 24, 2019, and claims benefit of German patent applications nos. DE 10 2018 117 999.5, filed on Jul. 25, 2018, and DE 10 2018 119 975.9, filed on Aug. 16, 2018.

FIELD OF THE INVENTION

The invention relates to a vehicle crane having a hydro-pneumatic suspension and having a braking system comprising wheel brakes, which system has a first brake circuit allocated to the wheel brakes of at least one vehicle axle of the vehicle crane and at least one further brake circuit allocated to the wheel brakes of at least one further vehicle axle of the vehicle crane.

BACKGROUND OF THE INVENTION

In order to obtain permission for a vehicle crane to travel on public roads, it must meet the respective country-specific requirements. Prerequisites therefor include mostly a type-approval, a general operating license or single operating license to be obtained individually by means of approval certificates. This is not only true for motor vehicles designed to transport people and/or goods, but also for special-purpose vehicles such as e.g. vehicle cranes for which the different locations of use are mostly reached via public roads, as is known. As autonomously driven vehicles, the wheeled running gear units thereof require a suitable braking system and a suitable suspension. With validity in the European Union and beyond, UN regulations stipulate requirements to be met—these include e.g. ECE R 13 containing the requirements for braking systems.

Conventional suspension systems mostly rely on mechanical springs, the vibrations of which are damped via telescopic shock absorbers. In contrast thereto, hydro-pneumatic suspension systems combine the functions of springs and absorbers in damper units operated with hydraulics and pneumatics. These comprise a hydraulic cylinder which is incorporated e.g. between a frame and a vehicle axle, which can move relative thereto, or a wheel, which can move relative thereto, of the vehicle crane. The hydraulic cylinders filled with oil are connected in a fluid-conducting manner with in each case a pressure vessel which is used as a reservoir. The reservoir is divided into two chambers by means of a membrane, wherein the chamber facing the hydraulic cylinder is filled with oil and the remaining chamber is filled with gas. Owing to its compressibility, the gas acts as a suspension element whilst the oil which can be displaced during the suspension process is used for damping. In contrast to mechanically suspended vehicles having a level which decreases as the weight increases (load-dependent ground clearance), hydro-pneumatic suspension systems permit a level which, compared thereto, is load-independent by changing the oil volume in the reservoir of the respective damper unit.

German utility model DE 20 2007 004 091 U1 discloses in this respect a vehicle crane which has such a hydro-pneumatic suspension. The hydro-pneumatic suspension is predominantly active when the vehicle crane is being moved on roads. In use whilst stationary, the resilient properties thereof can be blocked, whilst the level compensation of the vehicle crane, which continues to be possible e.g. for each axle, also permits its secure placement on sloping ground. Furthermore, the vehicle crane comprises a braking system, the specified design thereof requiring the disposition of two mutually independent brake circuits.

In order to meet for instance the design and operating regulations set forth in the German Road Traffic Ordinance, vehicles must have a braking system having prescribed deceleration values. Particularly in the case of large and in this respect heavy special-purpose vehicles, such as e.g. vehicle cranes, correspondingly high requirements are placed on the design of the braking system. Moving the vehicles on public roads requires that a maximum axle load is respected, wherein in particular travelling over bridges is limited to a maximum vehicle weight. If the actual axle load or the permissible vehicle weight exceed the respective permissible values, they must be reduced accordingly. In order to meet the official regulations, e.g. vehicle cranes must occasionally be designed such that at least one of their assemblies can be removed. The total weight, which can be influenced considerably in this manner, of the rest of the vehicle which can then travel on roads has a correspondingly significant effect on the brake power thereof and in this respect on the question of how to correctly actuate the braking system in order to meet the official regulations. The same applies to other vehicles, the respective loading state thereof, e.g. by picking up or unloading goods to be transported, being subject to corresponding fluctuations. The vehicles of this type known to date thus still have room for improvement in particular in view of the permissibility thereof in terms of the braking system thereof.

Furthermore, laid-open document DE 26 22 534 A1 discloses a load-dependent hydraulic four-circuit braking system of a utility vehicle having a hydro-pneumatic suspension. A brake pressure regulating valve is allocated to each suspension strut of the hydro-pneumatic suspension. An increase in pressure in the suspension strut is used in this case to increase the pressure in the allocated brake cylinder via the brake pressure regulating valve. A hydraulic pump provides the uninfluenced brake pressure. The hydro-pneumatic suspension and the hydraulic brake are thus connected together in terms of fluid technology via the brake pressure regulating valve. For the pressure increase, oil flows from the hydro-pneumatic suspension into the hydraulic braking system.

SUMMARY OF THE INVENTION

The invention provides a vehicle crane equipped with a hydro-pneumatic suspension where the actuation of the braking system thereof can be adapted, including continuously, to the respective weight status of the vehicle crane.

Accordingly, the vehicle crane in accordance with an aspect of the invention comprises at least one automatically load-dependent brake force regulator (ALB) which is coupled to the hydro-pneumatic suspension of the vehicle crane. The automatically load-dependent brake force regulator is operatively connected, at least in sections, to one of the brake circuits of the braking system. "In sections" means in this case that the automatically load-dependent brake force regulator can be operatively connected either to an entire brake circuit or only to a section, in this respect to at least one brake circuit section of a brake circuit. The automatically load-dependent brake force regulator and brake circuit or brake circuit section are operatively connected together such that a brake pressure which can be produced within the brake circuit or brake circuit section coupled to the automatically load-dependent brake force regulator can be altered with respect to a brake pressure which can be produced at the same time within the other brake circuit or brake circuit section on the basis of a weight status signal of the vehicle crane which can be produced from the hydro-pneumatic suspension. Accordingly, it is now possible that the brake pressures can have mutually different values in parts of the braking system owing to a changed overall weight of the vehicle crane. In other words, the automatically load-dependent brake force regulator ensures that the brake pressure which can be produced in the brake circuit or brake circuit section which is coupled at least in sections to the automatically load-dependent brake force regulator—and in this respect can be regulated—can be altered with respect to the brake pressure which can be produced at the same time in the other brake circuit or brake circuit section in dependence upon the respective weight status of the vehicle crane. Owing to the now-possible regulation of the brake pressures in parts of the braking system which previously would have remained the same when the overall weight of the vehicle crane changes, an advantageous adaptation to the dynamic forces of the vehicle resulting directly from the weight change is possible. In this respect it should be considered that the operating pressure of the braking system is typically adapted to the maximum permissible overall weight of the vehicle crane and the available pneumatic brake pressure cannot be increased. The automatically load-dependent brake force regulator used in accordance with the invention thus successfully prevents over-braking of the vehicle crane, should this have a lower vehicle weight by removing crane parts.

The advantage resulting therefrom can be considered that of a now-possible, overall advantageous adaptation of the brake force distribution within the individual brake circuits or brake circuit sections of the braking system in dependence upon a changing vehicle crane weight. Since the adaptation occurs without deliberate intervention by a person operating the vehicle crane, a brake force is always distributed appropriately to the wheel brakes of the braking system based on the respective weight status of the vehicle crane. Without such a brake force distribution, the or at least one of the rear or front axle(s) would e.g. also be actuated in the weight-reduced state, e.g. owing to the removal of an assembly of the vehicle crane, in the case of partial braking with the same pressure as the other axle(s). In that case, the rear and/or front wheels could be blocked and the vehicle crane could break away in an uncontrollable manner. The same also applies to a vehicle crane having more than two vehicle axles, in which two or more vehicle axles are each associated with one of the brake circuits or brake circuit sections. The load-dependent brake force regulation in accordance with the invention ensures for example a reduction in the brake pressure in the wheel brakes on at least one vehicle axle; dependent upon the respective weight status of the vehicle crane. Conversely, the brake pressure on at least one vehicle axle in certain weight statuses can exceed the brake pressure on at least one other vehicle axle.

According to a preferred development of the basic inventive concept, a regulation input can be arranged on the automatically load-dependent brake force regulator. "Arranged" means that the regulation input can be for example an integral, single-piece component of the automatically load-dependent brake force regulator, in particular the housing thereof, or else can be connected thereto as a separate component. In either case, the regulation input is designed and arranged such that it permits a fluid-conducting connection to the automatically load-dependent brake force regulator in terms of a connector. The regulation input is coupled to the hydro-pneumatic suspension of the vehicle crane in a fluid-conducting manner such that the respective pressure thereof can be used as the weight status signal used to actuate the automatically load-dependent brake force regulator. In this manner, the respective pressure of the hydro-pneumatic suspension can be in an advantageous manner a direct control variable for the distribution of the brake pressure within the brake circuits or brake circuit sections of the braking system.

Provision is preferably made that at least one suspension circuit of the hydro-pneumatic suspension is allocated to the regulation input, and this at least one suspension circuit is also allocated to at least some of the vehicle axles which are allocated to the respective automatically load-dependent brake force regulator, i.e. the associated brake circuit or brake circuit section. In this context, it is also preferred that the at least one suspension circuit is allocated to precisely the vehicle axles which are allocated to the respective automatically load-dependent brake force regulator, i.e. the associated brake circuit or brake circuit section.

In the specific application example, an e.g. proportional change in the distribution of the respective brake pressure—which occurs virtually in real time—to the brake circuits or brake circuit sections can occur on the basis of the respective weight status of the vehicle crane in order to effectively prevent in particular ineffective over-braking of the wheel brakes of one or more vehicle axles, the brakes being connected to a brake circuit or brake circuit section.

Basically, provision can already be made in a basic setting of the braking system that the same brake pressure prevails in all the brake circuits or brake circuit sections, but mutually different brake forces are available adapted to the vehicle crane and weight distribution thereof in the wheel brakes of the front, middle and rear axles. In this respect, the design and/or number of the wheel brakes is such that—in terms of the respective brake power—the brake force is advantageously distributed, in particular in the case of the maximum overall weight of the vehicle crane or the maximum permissible axle loads. This can occur e.g. by the number of the respective brake calipers and/or the size of the brake cylinders thereof. The weight of the vehicle crane which decreases accordingly when at least one assembly is removed can then be taken as a reason for reducing the effective pressure in one of the brake circuits and/or one of the brake circuit sections. The structural design otherwise provided for the maximum vehicle crane weight remains in this respect unaffected such that the brake force is adapted via the automatically load-dependent brake force regulator.

The invention makes provision that the brake pressure which can be produced within the brake circuit or brake circuit section coupled to the automatically load-dependent brake force regulator, the brake pressure being effective in particular on the associated wheels, corresponds to the brake pressure which can be produced at the same time within the other brake circuit and/or brake circuit section without a change by the automatically load-dependent brake force regulator. In this context provision is made that the brake pressure which can be produced within the brake circuit or brake circuit section coupled to the automatically load-dependent brake force regulator can then be regulated by the automatically load-dependent brake force regulator with respect to the value of the brake pressure which can be produced at the same time within the other brake circuit and/or brake circuit section. "Can be regulated" means that the respective brake pressure can be reduced accordingly by the automatically load-dependent brake force regulator.

By way of a corresponding design of the braking system, the natural circumstance can also be taken into account that, when braking a vehicle crane, the weight thereof has an increasing effect on the front wheels whilst the rear wheels are unloaded at the same time in relation to the vehicle crane weight to be diverted thereby into the ground. For this reason, the effectiveness in the deceleration of the front wheels is generally higher than that of the rear wheels, because the latter are quicker to be blocked owing to the removal of load and so can hardly contribute to the actual braking of the vehicle crane.

Alternatively, a basic setting of the braking system can be provided in which the brake pressures prevailing in the brake circuits or brake circuit sections differ from each other in order to achieve an advantageous distribution of the brake forces, in particular in the case of the maximum overall weight of the vehicle crane or the maximum permissible axle loads, to the individual wheel brakes.

In an embodiment within the scope of the invention, the automatically load-dependent brake force regulator is connected on the actuation-side to the hydro-pneumatic suspension and has a regulation range of up to at most 160 bar, preferably 200 bar. The regulation range is adapted to a vehicle crane for road travel operation. This unusually high pressure design—compared with typical automatically load-dependent brake force regulators—of the automatically load-dependent brake force regulator itself is advantageous because in particular suspension systems used in vehicle cranes are operated with e.g. a considerably higher operating pressure compared with other passenger cars or heavy-goods vehicles. This is required owing to the very high vehicle crane weight in order to be able to actuate the correspondingly designed damper units of the hydro-pneumatic suspension according to requirements. Compared with the use of possible pressure boosters in association with the utilization of an automatically load-dependent brake force regulator designed for lower pressures, a more compact design produced from fewer parts is achieved.

For the design of the automatically load-dependent brake force regulator outside or above its regulation range, a value of at most 250 bar, preferably at most 300 bar, in particular at most 350 bar could be stated as a possible pressurization from the hydro-pneumatic suspension. This pressure resistance allows a vehicle crane to also be operated outside of road travel operation in crane travel operation and thus when travelling in the rigged state and/or under load. Alternatively, provision can be made that, instead of designing the entire automatically load-dependent brake force regulator in a pressure-resistant manner, a protective valve having corresponding pressure resistance is connected upstream thereof, the valve closing at pressures of above 160 bar or 200 bar.

In accordance with a preferred development of the vehicle crane in accordance with the invention, the brake circuit or brake circuit section operatively connected to the automatically load-dependent brake force regulator can be allocated to one or more vehicle axles. Furthermore, the other brake circuit or brake circuit section can be allocated to at least one, preferably two or more, other vehicle axle(s). In particular in the case of a multi-axle vehicle crane, an actuation of the individual vehicle axles—which is optimum in relation to the vehicle crane design and/or structural weight distribution—can thus be effected in terms of the brake power on the individual wheels. In a corresponding manner, an automatically load-dependent brake force regulator can thus be allocated in each case to one or more brake circuits or brake circuit sections. The number and arrangement of the brake circuits or brake circuit sections is dependent upon the type of the vehicle crane, the number of axles thereof and weight distribution thereof. Depending upon the vehicle crane, the at least one automatically load-dependent brake force regulator can thus be allocated to each brake circuit or brake circuit section, irrespective of whether it is allocated to front, middle or rear axles of the vehicle crane. An indicator for the number and allocation of the automatically load-dependent brake force regulator to the brake circuits can be an advance consideration of the influence of a possible reduction in vehicle crane weight, by e.g. removing a telescoping jib for road travel, on the respective axle load.

In this context, the vehicle crane in accordance with the invention can have e.g. two to a total of e.g. ten individual vehicle axles. The brake circuit or brake circuit section operatively connected to the automatically load-dependent brake force regulator can be allocated to one or more vehicle axles, whilst the other brake circuit and/or brake circuit section is allocated to the remaining vehicle axles. Owing to the number and targeted apportioning of the vehicle axles to the brake circuits and/or brake circuit sections, an overall advantageous actuation of the wheel brakes of the braking system is achieved with respect to the different distribution of the brake pressure on these brake circuits and/or brake circuit sections.

Basically, the automatically load-dependent brake force regulator can preferably be operatively connected to at least the one brake circuit or brake circuit section, of which at least one axle, braked thereby, of the vehicle crane has the largest negative effects when reducing the vehicle crane weight. This circumstance is individual and dependent on the respective design of the vehicle crane and in particular the position of the least one assembly to be removed.

In a particularly preferred manner, the level of the hydro-pneumatic suspension of the vehicle crane in accordance with the invention can be regulated. For example, a change in volume of the oil in the associated suspension circuit can have an influence on the immersion depth of a piston into the hydraulic cylinder, which permits a height adjustment of the suspension system and thus a change in level of the vehicle crane. Such a level regulation permits a preferred adaptation per wheel, in particular per axle, to the respective ground. This is in relation to the vehicle crane whilst travelling and/or whilst stationary.

According to an advantageous development, the hydro-pneumatic suspension of the vehicle crane in accordance with the invention can have an axle load equalization within one of its suspension circuits. The axle load equalization can be effective at least between steered and/or non-steered vehicle axles for equalizing the axle loads thereof. Such an axle load equalization improves the driving comfort and the traction owing to the thus possible weight distribution between two or more vehicle axles, in particular away from paved ground. Furthermore, in this manner a further improvement in terms of over-braking of an individual or several vehicle axle(s) can be achieved. The hereby possible reduction of dynamic axle load fluctuations additionally reduces advantageously the loading on the respective ground on which the vehicle crane travels, in particular the road. Overall, the axle load equalization permits the greatest possible compensation of a possible longitudinal undulation of the ground to be travelled on.

The invention makes provision that the vehicle crane can also comprise two or more automatically load-dependent brake force regulators. In this case, each of these automatically load-dependent brake force regulators is coupled to one of the brake circuits or brake circuit sections. Owing to the use of more than one automatically load-dependent brake force regulator, an improved adaptation of the respective brake pressures can be achieved. This is achieved in particular against the background of a weight distribution of the remaining overall weight of the vehicle crane, which distribution occasionally changes greatly when removing one or more assemblies of the vehicle crane. For example, only the front or the rear brake circuit or a corresponding brake circuit section thereof can be coupled to an automatically load-dependent brake force regulator. Alternatively thereto, both brake circuits or corresponding brake circuit sections thereof can be coupled to an automatically load-dependent brake force regulator. The arrangement of one or more automatically load-dependent brake force regulators accordingly also applies, of course, when the vehicle crane is to comprise more than two brake circuits in relation to its operating brakes.

In association with the arrangement of two or more automatically load-dependent brake force regulators, these can be set identically or in a mutually different manner. This is the case in particular in relation to the regulation and/or response behavior thereof. In this manner, the requirements of such a brake pressure regulation arising from the respective design of the vehicle crane can advantageously be met. For instance, the respective weight distribution in relation to the vehicle crane after removing at least one of its assemblies can be mutually different, occasionally caused by the design, which can be taken into consideration accordingly by a targeted arrangement and setting and incorporation in the braking system in order to achieve the best possible results in relation to the braking behavior.

The vehicle crane in accordance with the invention presented here permits the overall simple and effective adaptability of the actuation of its braking system to its respective weight status. Owing to the incorporation of at least one correspondingly designed automatically load-dependent brake force regulator between one of the brake circuits to be regulated or one of its brake circuit sections to be regulated and the hydro-pneumatic suspension, the adaptability can be performed in an automated manner and preferably continuously, which permits an always optimum distribution of the brake pressure within the individual brake circuits and/or brake circuit sections thereof and the vehicle axles or wheel brakes connected thereto. Discrepancies in terms of the brake force distribution otherwise quickly occurring in the case of a changed weight status and over-braking of at least one individual vehicle axle associated therewith are virtually excluded by the design in accordance with the invention. With respect to occasionally possible manual changes in relation to the brake force distribution, the vehicle crane in accordance with the invention allows an automated and thus more secure adaptation. An otherwise possible erroneous operation in the case of manual adjustment with corresponding consequences is thus virtually excluded.

Provision is preferably made that the braking system is pneumatic.

The present invention is suitable particularly for vehicle cranes comprising at least three vehicle axles.

Moreover, provision is preferably made that the number of brake circuits or brake circuit sections is greater than the number of automatically load-dependent brake force regulators. In other words, no automatically load-dependent brake force regulator is allocated to a brake circuit or brake circuit section and thus at that location the full brake pressure always prevails.

An exemplified embodiment of the invention will be explained in more detail with the aid of the following description of the figures illustrating a vehicle crane in accordance with the invention having eight vehicle axles.

DESCRIPTION OF THE PREFERRED EMBODIMENTS

Figure 1:
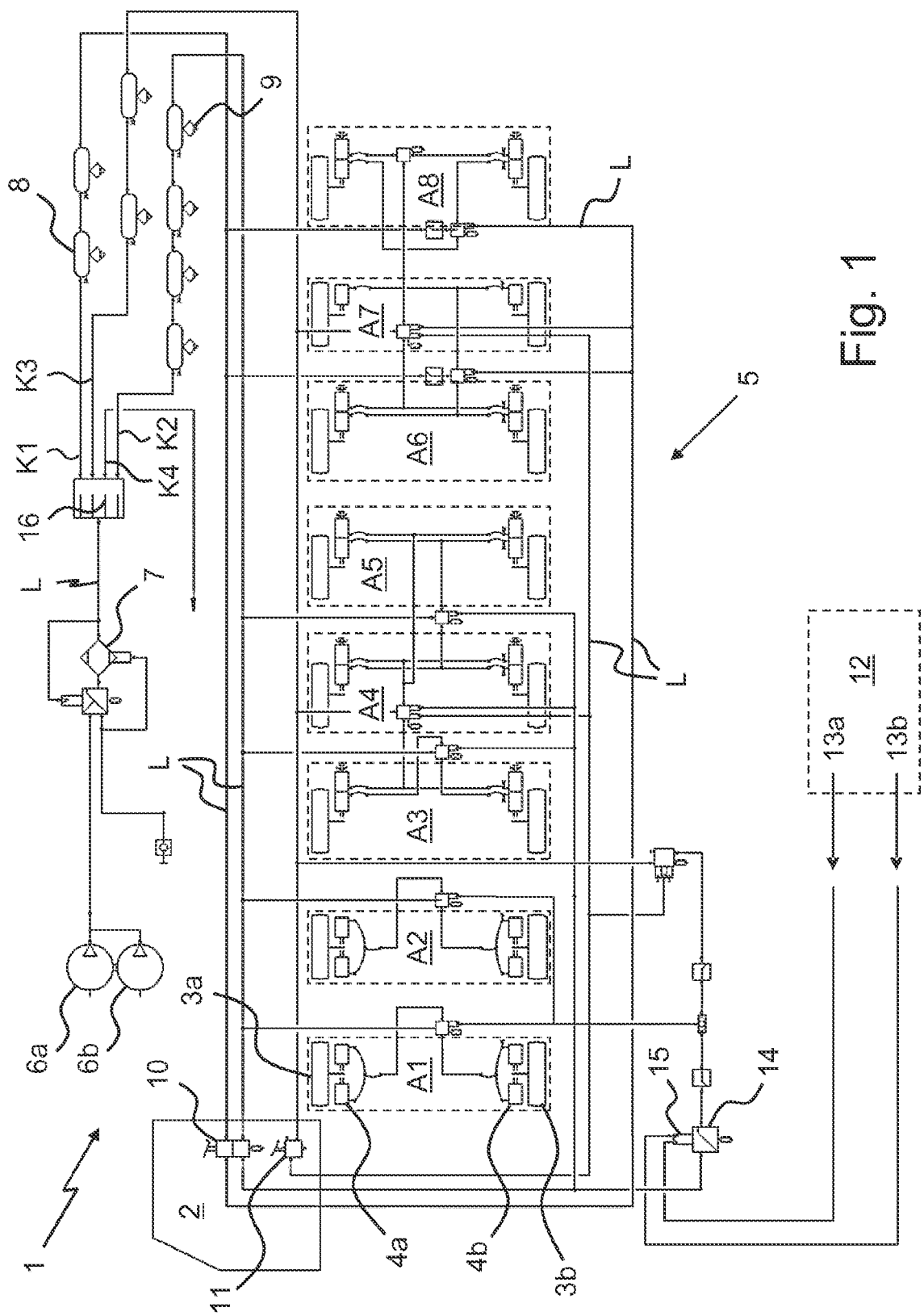
FIG. 1 shows a schematic diagram of a braking system of a vehicle crane in accordance with the invention.

FIG. 1 shows a vehicle crane 1 in accordance with the invention which comprises a wheeled running gear unit having a total of eight vehicle axles A1-A8 which are spaced apart from each other in parallel and are shown by way of example here. A vehicle cabin 2 indicates the front part of the vehicle crane 1. The illustration makes it clear that for example the vehicle axle A1 adjoining the vehicle cabin 2 embodies the foremost of the front vehicle axles A1 to A5, whilst out of the further rear vehicle axles A6 to A8, the vehicle axle A8 at the opposite end and in this respect furthest away from the foremost vehicle axle A1 is the rearmost vehicle axle A8 of the vehicle crane 1. Each of these eight vehicle axles A1 to A8 comprises two opposite wheels 3a, 3b rotatably mounted thereon and thus each has a right wheel 3a and an associated left wheel 3b. A corresponding right wheel brake 4a or a corresponding left wheel brake 4b is allocated to each of these wheels 3a, 3b in order to delay to the point of preventing the free rotatability thereof as required. It can be seen that the two front vehicle axles A1, A2 in the example shown here are each equipped with two wheel brakes 4a, 4b or brake calipers (double caliper brakes) in order to structurally achieve a braking action which is increased compared with the other vehicle axles A3 to A8 and is adapted to the maximum permissible axle loads. In contrast thereto, the other wheel brakes 4a, 4b in the present case are single caliper brakes.

The wheel brakes 4a, 4b are part of a pneumatic braking system 5, the individual components thereof being connected together in a fluid-conducting manner via a multiplicity of pneumatic lines L. These components include pneumatic pumps 6a, 6b—two in the example shown here— which are provided having an air dryer 7, connected there between, and a protective valve 16 for filling air containers 8—each equipped with a separator 9—with air. The air containers 8 are used as pneumatic pressure reservoirs in order to provide the required pneumatic pressure for operating the wheel brakes 4a, 4b each time. The braking system 5 comprises primarily two mutually separate brake circuits K1, K2 (operating brakes) in terms of a dual-circuit braking system having two operating brake circuits for the thus two structurally mutually separate operating brakes of the vehicle crane 1. The wheel brakes 4a, 4b of a vehicle axle A1 to A8 are each allocated to one of these two brake circuits K1, K2. The brake circuits K1, K2 comprise a rear brake circuit K1 and a front brake circuit K2. The front brake circuit K2 is divided into a first front brake circuit section K2.1 and a second front brake circuit section K2.2, as explained in more detail hereinafter, in particular with respect to FIG. 3. The brake circuits K1, K2 are coupled to a brake pedal 10 arranged in the vehicle cabin 2 and acting as a foot brake, and so all the wheel brakes 4a, 4b can be activated accordingly by operating the pedal. Furthermore, a lever 11 is provided in the vehicle cabin 2 which is used to operate a structurally third brake in the form of a hand brake. The fluid-conducting connection thereof to some of the wheel brakes 4a, 4b formed as spring brake cylinders is effected via a third brake circuit K3 for a hand brake, which third circuit is separate from the two brake circuits K1, K2 of the operating brakes. A further pressure circuit K4, only indicated in FIG. 1, is used to supply auxiliary consumers, which is not shown in more detail.

Furthermore, the vehicle crane 1 has a hydro-pneumatic suspension 12 which, for reasons of clarity, is not illustrated in detail but only symbolically and permits—in a manner not illustrated in more detail—the typical suspension and damping of the wheels 3a, 3b or vehicle axles A1 to A8 which can move relative to the rest of the vehicle crane. Furthermore, this can preferably comprise level regulation. The hydro-pneumatic suspension 12 is divided into a plurality of circuits. This means that its hydraulic cylinders, not illustrated in more detail, are connected together in a fluid-conducting manner such that they are each allocated to a suspension circuit 13a, 13b. Preferably, the hydro-pneumatic suspension 12 can have an axle load equalization within at least one suspension circuit 13a, 13b. Typically, the suspension circuits 13a, 13b are split between the right wheels 3a and the left wheels 3b. In addition, the suspension circuits 13a, 13b are further allocated to individual, or a plurality of, axles A1 to A8. The previously described vehicle crane 1 comprises three brake circuits K1, K2.1 and K2.2, to which the axles A1 and A2; A3 and A4 as well as A5 to A8 are each allocated. Therefore, in total six suspension circuits 13a, 13b are preferably provided, of which the associated right and left suspension circuits 13a, 13b are each allocated to one of the brake circuits K1, K2.1 and K2.2 and thus to the axles A1 and A2; A3 and A4 as well as A5 to A8. The best regulation results are hereby achieved. More than one right and one left suspension circuit 13a, 13b can also be provided for each brake circuit K1, K2.1 and K2.2. However, it is then recommended to provide one or further automatically load-dependent brake force regulator(s) 14 for each axle A1 to A8 and suspension circuit 13a, 13b. The more than two suspension circuits 13a, 13b per brake circuit K1, K2.1 and K2.2 can also be connected to only one provided automatically load-dependent brake force regulator 14. The signals therefrom are then processed as an arithmetic average. As a result, the brake is always regulated according to the current axle load. The suspension circuits and the brake circuits can also overlap. However, this should be avoided since the regulation will also become more challenging as a result.

Since the brakes of one axle A1 to A8 having right and left wheels 3a, 3b are generally each allocated to two suspension circuits 13a, 13b, the axle load is produced from these two suspension circuits 13a, 13b. Accordingly, the brake pressure is regulated via the automatically load-dependent brake force regulator 14 corresponding to the axle load. Any fluctuations in the wheel loads between the right and left wheels 3a, 3b do not result in a change to the brake forces. Only when the axle load as a whole changes is the associated brake pressure also adapted by the automatically load-dependent brake force regulator 14.

If the full suspension pressure prevails in the suspension circuits 13a, 13b per brake circuit K1, K2.1 and K2.2, the associated automatically load-dependent brake force regulator 14 makes the full brake pressure available to the respective brake circuit K1, K2.1 and K2.2. Furthermore, the suspension circuits 13a, 13b and the brake circuits K1, K2.1 and K2.2 are separated in terms of fluid technology and fluid is not exchanged there between.

In accordance with aspects of the invention, the vehicle crane 1 comprises one or more automatically load-dependent brake force regulator(s) 14 which is/are integrated between the braking system 5 and the hydro-pneumatic suspension 12 in the manner described in more detail hereinafter. The hydro-pneumatic suspension 12 is connected to the automatically load-dependent brake force regulator(s) 14 on the actuation-side. The signals from the two suspension circuits 13a, 13b are processed by the automatically load-dependent brake force regulator 14 as an arithmetic average. In the present case, an individual automatically load-dependent brake force regulator 14 can be seen by way of example. Owing to the high suspension pressures required in a vehicle crane 1, the automatically load-dependent brake force regulator(s) 14 is/are designed for pressurization up to at least 160 bar, preferably up to 200 bar, in a regulation range thereof. The regulation range is adapted to a vehicle crane 1 for road travel operation. In order to be able to operate the vehicle crane 1 also in crane travel operation and thus when travelling in the rigged state and/or under load, the automatically load-dependent brake force regulator is protected against higher pressures outside or above its regulation range. This can occur on the one hand by virtue of the fact that the automatically load-dependent brake force regulator is designed for pressurization from the hydro-pneumatic suspension up to at most 250 bar, preferably at most 300 bar, in particular at most 350 bar, and on the other hand by virtue of the fact that a protective valve having corresponding pressure resistance is connected upstream of the automatically load-dependent brake force regulator, the valve closing at pressures of above 160 bar or 200 bar.

Figure 2:
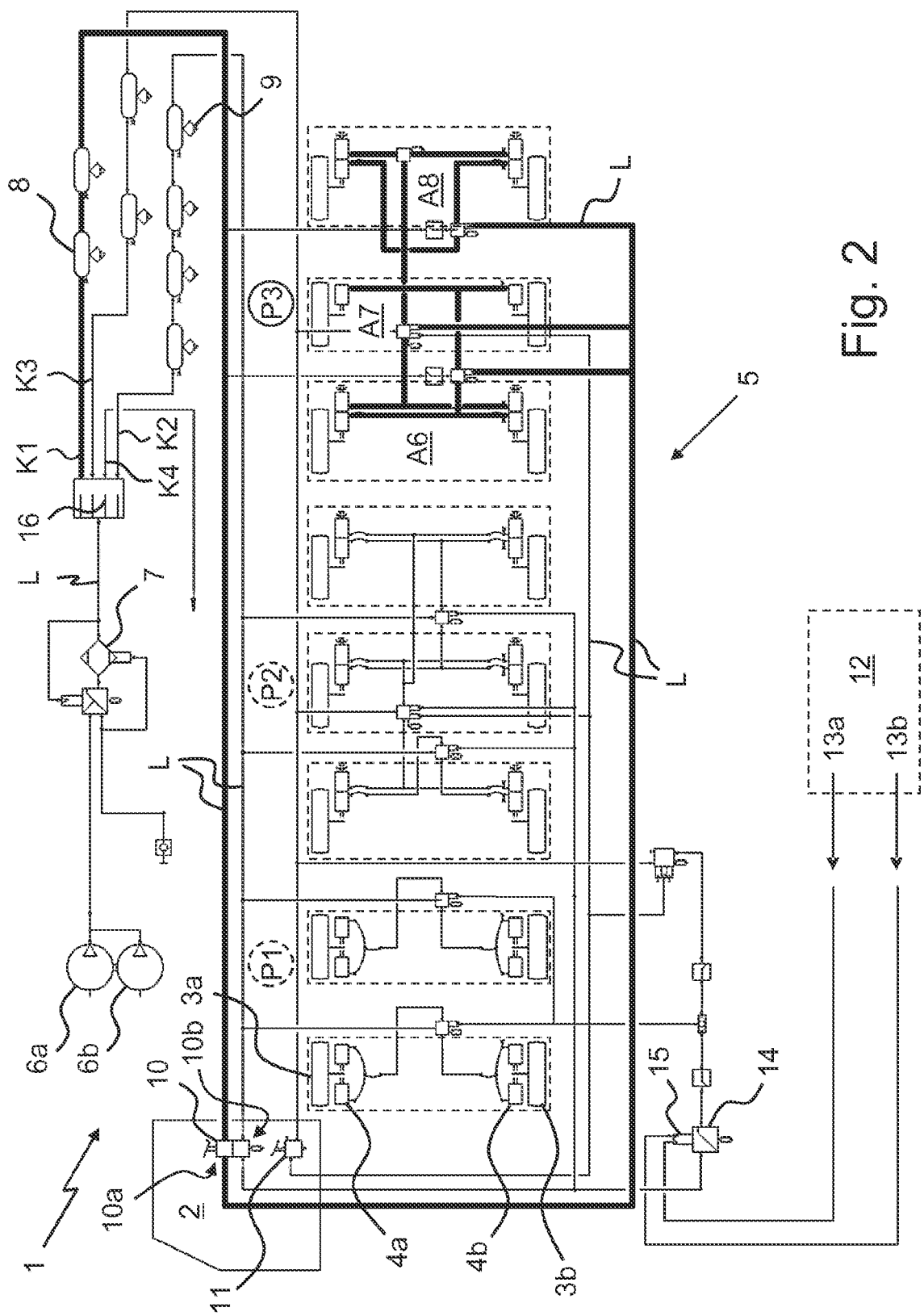
FIG. 2 shows the diagram of FIG. 1 with a first brake circuit highlighted using thick lines.

FIG. 2 shows the vehicle crane 1 already shown in FIG. 1, in which one of the two brake circuits K1, K2 in the form of a rear brake circuit K1 is highlighted—now using thick lines. It can be seen that the rear brake circuit K1 is connected to the pneumatic pumps 6a, 6b in a fluid-conducting manner via pneumatic lines L, the pumps being structurally separate in particular from those pneumatic lines L supplying the other brake circuit K2. This applies also for the incorporation of the brake pedal 10 which comprises two mutually separate valves 10a, 10b for this purpose. The rear brake circuit K1 is connected to a first valve of the brake pedal 10 whilst the other, front brake circuit K2 is connected to a second valve of the brake pedal 10 (see also FIG. 3). In this embodiment, the rear brake circuit K1 is allocated to the three rear vehicle axles A6 to A8. This means that upon operation of the brake pedal 10 only the wheel brakes 4a, 4b arranged on the three rear vehicle axles A6 to A8 are exclusively actuated by the brake pressure then accordingly present within the rear brake circuit K1.

Figure 3:
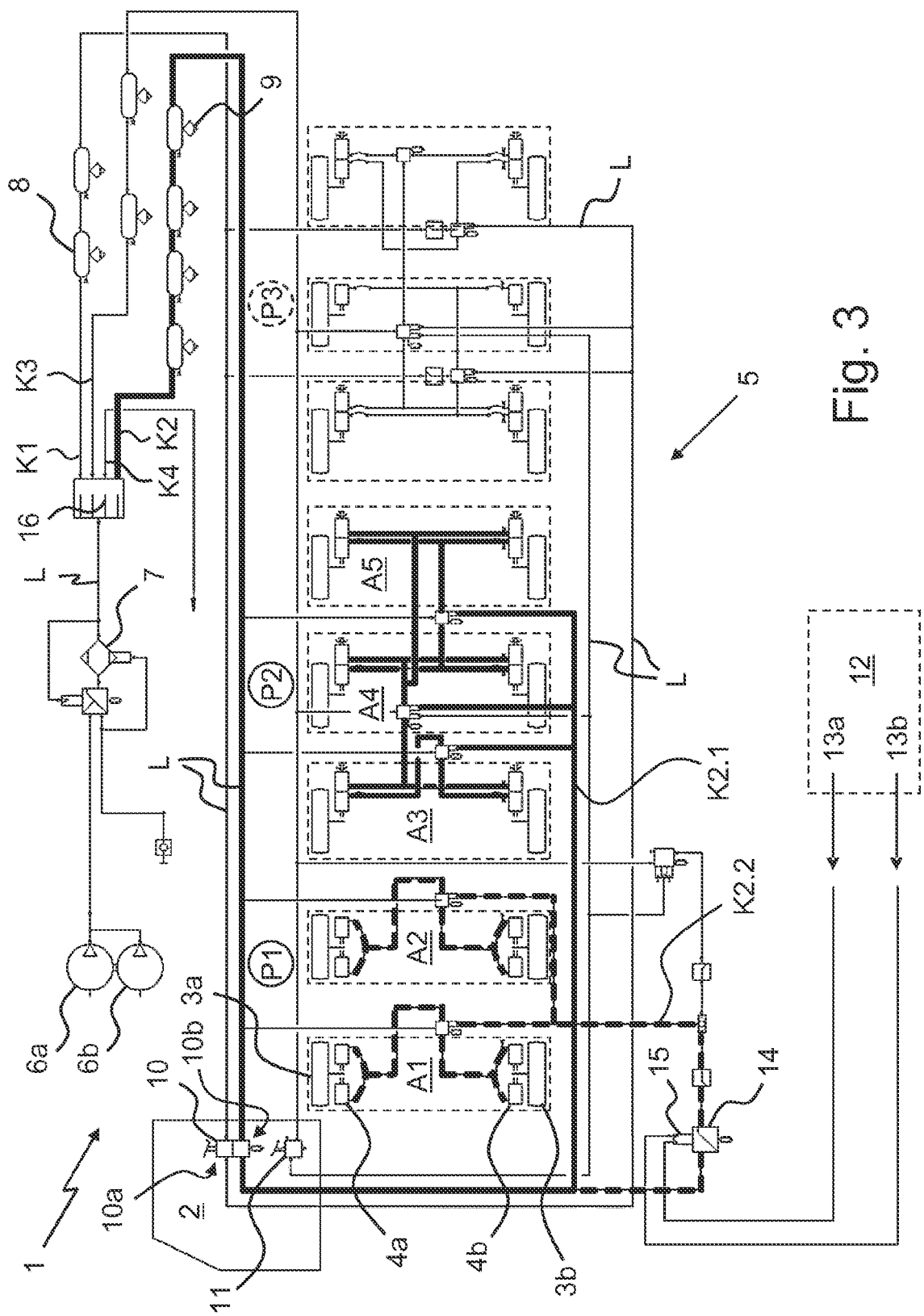
FIG. 3 shows the diagram of FIG. 1 with a second brake circuit highlighted using thick lines and divided into two brake circuit sections.

FIG. 3 likewise shows the vehicle crane 1 already shown in FIG. 1 and also FIG. 2, in which now the front brake circuit K2 is highlighted using thick lines. In order to clarify the division, in sections, of the front brake circuit K2 into the first and second front brake circuit sections K2.1, K2.2, the first front brake circuit section K2.1 thereof is illustrated with a continuously thick line whilst the second front brake circuit section K2.2 is highlighted with a broken thick line.

It can be seen that the first front brake circuit section K2.1 is allocated to the middle three vehicle axles A3 to A5. This means that upon operation of the brake pedal 10 only the wheel brakes 4a, 4b arranged on these middle three vehicle axles A3 to A5 are exclusively actuated by the brake pressure then present within the section of the front brake circuit K2—in the form of the first front brake circuit section K2.1—i.e., the section K2.2 is actuated with the same pressure as K1 but influenced by the automatically load-dependent brake force regulator 14.

It can further be seen that the other section of the front brake circuit K2—in the form of the second front brake circuit section K2.2.—is allocated to the front two vehicle axles A1, A2. This means that upon operation of the brake pedal 10 only the wheel brakes 4a, 4b arranged on the two front vehicle axles A1, A2 are exclusively actuated by the brake pressure then present within the second front brake circuit section K2.2 containing the automatically load-dependent brake force regulator 14, the brake pressure being able to be regulated thereby.

Upon operation of the brake pedal 10, the wheel brakes 4a, 4b of the vehicle axles A1 to A8—of which there are eight in total in the present example—are pneumatically actuated at the same time via their respective brake circuit K1, K2. The wheel brakes 4a, 4b connected to the rear brake circuit K1 and the first front brake circuit section K2.1 (as a section of the front brake circuit K2) are actuated directly via the brake pedal. In accordance with the invention, the automatically load-dependent brake force regulator 14 is operatively connected to the second front brake circuit section K2.2 (in the form of a section of the front brake circuit K2) such that a brake pressure P1 which can be regulated within the second front brake circuit section K2.2 via the automatically load-dependent brake force regulator 14 can be altered with respect to the brake pressures P2, P3 which can be produced at the same time within the first front brake circuit section K2.1 and the rear brake circuit K1 on the basis of a weight status signal of the vehicle crane 1 which can be produced from the hydro-pneumatic suspension 12. For this purpose, the automatically load-dependent brake force regulator 14 comprises a regulation input 15 coupled to the relevant suspension circuits 13a, 13b of the hydro-pneumatic suspension 12 in a fluid-conducting manner such that the respective pressure thereof can be used as the weight status signal used to actuate the automatically load-dependent brake force regulator 14.

The structural design and/or setting can be selected such that the brake pressure P1 prevailing within the second front brake circuit section K2.2 corresponds to the brake pressure P2 prevailing at the same time within the first front brake circuit section K2.1 without a change by the automatically load-dependent brake force regulator 14. The brake pressures P1, P2—in the front brake circuit K2 composed of the first and second front brake circuit sections K2.1, K2.2—can correspond to the brake pressure P3 prevailing at the same time in the rear brake circuit K1 or can differ therefrom.

The invention claimed is:

1. A vehicle crane said vehicle crane comprising:
a hydro-pneumatic suspension and a braking system that comprises wheel brakes and a first brake circuit allocated to the wheel brakes of at least one vehicle axle and at least one second brake circuit allocated to the wheel brakes of at least one further vehicle axle, wherein the brake circuits include brake circuit sections;
wherein the hydro-pneumatic suspension is coupled to at least one automatically load-dependent brake force regulator that is operatively connected to one of the brake circuits or one of their brake circuit sections, and wherein a brake pressure produced within the brake circuit or brake circuit section coupled to the automatically load-dependent brake force regulator can be altered with respect to a brake pressure produced at the same time within the other brake circuit or brake circuit section on the basis of a weight status signal of the vehicle crane produced from the hydro-pneumatic suspension such that the brake pressure produced within the brake circuit or brake circuit section coupled to the automatically load-dependent brake force regulator corresponds to the brake pressure produced at the same time within the other brake circuit and/or brake circuit section without a change by the automatically load-dependent brake force regulator, wherein the brake pressure produced within the brake circuit or brake circuit section coupled to the automatically load-dependent brake force regulator can be regulated by the automatically load-dependent brake force regulator with respect to the value of the brake pressure produced at the same time within the other brake circuit and/or brake circuit section, and wherein the number of brake circuits or brake circuit sections is greater than the number of automatically load-dependent brake force regulators.

2. The vehicle crane as claimed in claim 1, wherein a regulation input is arranged on the automatically load-dependent brake force regulator and is coupled to the hydro-pneumatic suspension in a fluid-conducting manner such that the respective pressure thereof can be used as the weight status signal used to actuate the automatically load-dependent brake force regulator.

3. The vehicle crane as claimed in claim 2, wherein at least one suspension circuit of the hydro-pneumatic suspension is allocated to the regulation input, and this at least one suspension circuit is also allocated to at least some of the vehicle axles which are allocated to the respective automatically load-dependent brake force regulator.

4. The vehicle crane as claimed in claim 3, wherein the at least one suspension circuit is allocated to precisely the vehicle axles which are allocated to the respective automatically load-dependent brake force regulator.

5. The vehicle crane as claimed in claim 1, wherein the automatically load-dependent brake force regulator is connected on the actuation-side to the hydro-pneumatic suspension and has a regulation range of up to at most 200 bar.

6. The vehicle crane as claimed in claim 5, wherein the automatically load-dependent brake force regulator has, outside its regulation range, a pressure resistance of up to at most 350 bar, or has a protective valve having corresponding pressure resistance connected upstream of the automatically load-dependent brake force regulator.

7. The vehicle crane as claimed in claim 1, wherein the brake circuit or brake circuit section operatively connected to the automatically load-dependent brake force regulator is allocated to one or more vehicle axles.

8. The vehicle crane as claimed in claim 1, wherein the level of the hydro-pneumatic suspension is configured to be regulated.

9. The vehicle crane as claimed in claim 1, wherein the hydro-pneumatic suspension includes an axle load equalization within a suspension circuit.

10. The vehicle crane as claimed in claim 1, wherein two or more automatically load-dependent brake force regulators are provided, and wherein each of these automatically load-dependent brake force regulators is coupled to one of the brake circuits or brake circuit sections.

11. The vehicle crane as claimed in claim 10, wherein the automatically load-dependent brake force regulators are set identically or in a mutually different manner in relation to the regulation and/or response behavior thereof.

12. The vehicle crane as claimed in claim 1, wherein the braking system is pneumatic.

13. The vehicle crane as claimed in claim 1, wherein the number of vehicle axles is at least three.

14. A vehicle crane said vehicle crane comprising:
a hydro-pneumatic suspension and a braking system that comprises wheel brakes and a first brake circuit allocated to the wheel brakes of at least one vehicle axle and at least one second brake circuit allocated to the wheel brakes of at least one further vehicle axle, wherein the brake circuits include brake circuit sections;
wherein the hydro-pneumatic suspension is coupled to at least one automatically load-dependent brake force regulator that is operatively connected to one of the brake circuits or one of their brake circuit sections, and wherein a brake pressure produced within the brake circuit or brake circuit section coupled to the automatically load-dependent brake force regulator can be altered with respect to a brake pressure produced at the same time within the other brake circuit or brake circuit section on the basis of a weight status signal of the vehicle crane produced from the hydro-pneumatic suspension such that the brake pressure produced within the brake circuit or brake circuit section coupled to the automatically load-dependent brake force regulator corresponds to the brake pressure produced at the same time within the other brake circuit and/or brake circuit section without a change by the automatically load-dependent brake force regulator, wherein the brake pressure produced within the brake circuit or brake circuit section coupled to the automatically load-dependent brake force regulator can be reduced by the automatically load-dependent brake force regulator with respect to the value of the brake pressure produced at the same time within the other brake circuit and/or brake circuit section; and
wherein the number of brake circuits or brake circuit sections is greater than the number of automatically load-dependent brake force regulators.

15. The vehicle crane as claimed in claim 14, wherein a regulation input is arranged on the automatically load-dependent brake force regulator and is coupled to the hydro-pneumatic suspension in a fluid-conducting manner such that the respective pressure thereof can be used as the weight status signal used to actuate the automatically load-dependent brake force regulator.

16. The vehicle crane as claimed in claim 15, wherein at least one suspension circuit of the hydro-pneumatic suspension is allocated to the regulation input, and this at least one suspension circuit is also allocated to at least some of the vehicle axles which are allocated to the respective automatically load-dependent brake force regulator.

17. The vehicle crane as claimed in claim 16, wherein the at least one suspension circuit is allocated to precisely the vehicle axles which are allocated to the respective automatically load-dependent brake force regulator.

18. The vehicle crane as claimed in claim 14, wherein the automatically load-dependent brake force regulator is connected on the actuation-side to the hydro-pneumatic suspension and has a regulation range of up to at most 200 bar, and wherein the automatically load-dependent brake force regulator has, outside its regulation range, a pressure resistance of up to at most 350 bar, or has a protective valve having corresponding pressure resistance connected upstream of the automatically load-dependent brake force regulator.

19. The vehicle crane as claimed in claim 14, wherein the brake circuit or brake circuit section operatively connected to the automatically load-dependent brake force regulator is allocated to one or more front vehicle axles.

20. The vehicle crane as claimed in claim 14, wherein two or more automatically load-dependent brake force regulators are provided, and wherein each of these automatically load-dependent brake force regulators is coupled to one of the brake circuits or brake circuit sections.

* * * * *